United States Patent
Huaguang et al.

(10) Patent No.: US 7,953,828 B2
(45) Date of Patent: May 31, 2011

(54) DISTRIBUTED NETWORKED DATA ACQUISITION DEVICE

(75) Inventors: Zhang Huaguang, Shenyang (CN); Feng Jian, Shenyang (CN); Yang Dongsheng, Shenyang (CN); Sun Qiuye, Shenyang (CN); Song Conghui, Shenyang (CN); Liu Jinhai, Shenyang (CN); Liu Xiuchong, Shenyang (CN); Wang Zhiliang, Shenyang (CN); Sun Kai, Shenyang (CN); Ren He, Shenyang (CN)

(73) Assignee: Northeastern University, Liaoning Province (CN)

( * ) Notice: Subject to any disclaimer, the term of this patent is extended or adjusted under 35 U.S.C. 154(b) by 1031 days.

(21) Appl. No.: 11/567,732

(22) Filed: Dec. 6, 2006

(65) Prior Publication Data

US 2007/0174451 A1 Jul. 26, 2007

(30) Foreign Application Priority Data

Jan. 20, 2006 (CN) .......................... 2006 1 0045690

(51) Int. Cl.
*G06F 15/177* (2006.01)
(52) U.S. Cl. .......................... 709/220; 709/221; 709/222
(58) Field of Classification Search .................. 709/201, 709/203, 217, 224, 225, 226, 220–222
See application file for complete search history.

(56) References Cited

U.S. PATENT DOCUMENTS

| | | | | |
|---|---|---|---|---|
| 6,032,154 A * | 2/2000 | Coleman et al. | ........... | 707/104.1 |
| 6,903,681 B2 * | 6/2005 | Faris et al. | ................. | 342/357.4 |
| 6,970,808 B2 * | 11/2005 | Abhulimen et al. | .......... | 702/185 |
| 7,008,538 B2 * | 3/2006 | Kasparian et al. | ............ | 210/610 |
| 7,148,796 B2 * | 12/2006 | Joy et al. | ........................ | 340/521 |
| 7,397,547 B2 * | 7/2008 | Chiarello et al. | ............. | 356/136 |
| 7,456,733 B2 * | 11/2008 | Joy et al. | ........................ | 340/521 |
| 7,456,736 B2 * | 11/2008 | Primm et al. | ................. | 340/540 |
| 7,471,379 B2 * | 12/2008 | Chiarello et al. | ............. | 356/136 |
| 7,542,963 B2 * | 6/2009 | Primm | .............................. | 707/2 |
| 7,657,944 B2 * | 2/2010 | Kanno | ............................. | 726/27 |
| 2007/0041333 A1 * | 2/2007 | Twitchell | ...................... | 370/252 |
| 2007/0118253 A1 * | 5/2007 | Dahler | ............................. | 701/1 |

OTHER PUBLICATIONS www.embedded-system.net, "Samsung S3C2410 for embedded-mobile applications", Oct. 2006 pp. 1-4.*
www.microcontrollershop.com, "Cirrus Logic EP9315 (ARM9) Development Board", Jan. 30, 2006 , pp. 1-4.*
www.cwlinux.com, "CWLINUX Limited CWVZ328 Development Platform", Jul. 2003, pp. 1-2.*

* cited by examiner

*Primary Examiner* — Mohamed Wasel

(57) ABSTRACT

A distributed networked data acquisition system having distributed networked data acquisition devices based on embedded Linux development platform having an ARM9 CPU is proposed. The system is defined as one or more distributed networked data acquisition devices together with a host. The host could dynamically display data and also coordinate and control the many distributed networked data acquisition devices. Each distributed networked data acquisition device is connected with the host by means of transmission media. The distributed networked data acquisition devices adopts the distributed data acquisition network to implement multi-point data acquisition having many distributed networked data acquisition devices working together and using several UTPs to connect with the distributed networked data acquisition devices in various distribution points. Each distributed networked data acquisition device can connect with different types of sensors, and each sensor can collect different types of continuous signals.

9 Claims, 7 Drawing Sheets

DISTRIBUTED NETWORKED DATA ACQUISITION DEVICE

CROSS-REFERENCE TO RELATED APPLICATIONS

This application claims the benefit of China Patent Application No. 200610045690.8, filed Jan. 20, 2006. The disclosure of the above application is incorporated herein by reference.

FIELD OF THE INVENTION

The present invention belongs to the field of information technology, and is especially related to a form of distributed networked data acquisition device.

BACKGROUND OF THE INVENTION

Due to the presence of complex and diverse application environments in the field, the requirements of the distributed networked data acquisition devices are also varied. It is well-known that the conventional data acquisition devices have problems with limited signal processing speeds, lower level of integration, unable to implement distributed data acquisition and remote data integration processing, unable to meet the complex processing requirements, and the having of limited data throughputs, etc. For example, a so-called "data acquisition sensor" is related to a new type of passive remote data acquisition sensor in the field of water meters, electric meters, gas meters, and other data acquisition and transmission instruments. The sensor is mainly applied in the data acquisition, data storage, and data transmission of a wide variety of currently popular diversified direct-read register typed meters; and the sensor can only be connected with the direct-read meters. Another example, is a so-called "remote data acquisition and transmission system", comprises of a data acquisition terminal which connects with a main processor via the RS232 serial ports/universal serial bus interface. The aforementioned processor then connects, receives, and compresses the data collected from the data acquisition terminal, and then transmits the processed data to a transmission module. Its distinguishing feature is the ability for implementing wireless data transmission. But the wireless transmission is of high-cost, and is of poor stability because of weather conditions, and other factors. The aforementioned conventional patented product has a data acquisition terminal that cannot achieve multi-point data acquisition over long distances. In short, the shortcomings of the data acquisition devices presently available include the following:

1) Is able to collect only single species of signals. The devices can only collect discrete signals, but cannot handle continuous signals, so that it has inadequate interchangeability, and has limited applications.

2) Has only a single acquisition point. The device cannot meet and adapt to the complex processing requirements which requires multi-point data acquisition over long distances and simultaneous analytical processing. The processing speed is not high enough, and the extensibility is inadequate.

3) Has poor communication capability. Because the single chip microcomputer (SCM) uses serial interfaces for performing remote data transmission by means of communication broadcast equipments, it is therefore difficult to guarantee high-speed real-time data transmission, and also difficult for achieving internet communications or making the presently available systems with the acquisition devices to be "firmly bonded" with the communication equipments. As the present environment changes or as the external equipments requires updating, it is necessary to adjust the peripheral equipments and to modify the source codes in the control system, which leads to having relatively difficult system maintenance.

4) The speed of data processing is yet to be raised. The speed is not high enough because of the complexity of the directives processing and the speed bottleneck for communications between the CPU and the peripherals such as the memory. These reasons have led to inadequate speeds that are not adaptable to support situations where the data processing requirements are much higher, such as in image processing.

SUMMARY OF THE INVENTION

In accordance with the problems in the prior arts, the present invention provides a distributed networked data acquisition system and device.

The present invention relates to a distributed networked data acquisition system based on a distributed networked data acquisition device, which is based on an embedded Linux development platform.

The distributed networked data acquisition system, according to the present invention, includes the following: an embedded Linux development platform, a distributed data acquisition network, a system, which includes a plurality of distributed networked data acquisition devices and a host, a plurality of data acquisitions, one or more transmission media, one or more sensors, and a plurality of unshielded twisted pairs (UTP). The host is to implement dynamic display of the data acquisitions, and coordination and control of the distributed networked data acquisition devices, and the distributed networked data acquisition devices are connected with the host using the transmission media and utilizing the distributed data acquisition network for implementing multi-point data acquisition of having the distributed networked data acquisition devices working together and using the UTP to connect with the distributed networked data acquisition device at each distribution point, wherein each distributed networked data acquisition device is able to connect with different types of sensors, and each sensor is able to detect different types of continuous signals.

The present invention relates to a distributed networked data acquisition device based on an embedded Linux development platform using a ARM9 CPU with a ARM920T core. It is widely applicable for use in complex industrial monitoring, which requires real-time collection of multi-point signals.

The distributed networked data acquisition device, according to the present invention, includes the following: an embedded microcontroller, which is based on a core, a serial interface based on the core, a GPS receiver, a reset chip, a clock chip, an IIC interface, a power supply chip, a flash memory chip, a SDRAM chip, a LCD display, a keyboard, an Ethernet controller, an USB interface, a USB/Serial converter, an A/D converter, an integrated D/A filtering circuit, a counter, a JTAG interface, and a clock oscillator chip. In the data acquisition device, the embedded microcontroller is connected with the clock oscillator chip, the clock oscillator chip OSC is to be plugged-in to the power supply chip; the reset chip is connected with the embedded microcontroller; and the reset chip is to be plugged-in to the power supply chip; the flash memory chip is mapped in a first region of the embedded microcontroller, and making the address lines of the embedded microcontroller to be "shifted-left" by one bit, and the address of the SDRAM chip is mapped in the second region of the embedded microcontroller, the A/D converter is connected with the USB interface of the embedded microcontroller through the USB/Serial converter; the integrated D/A filter circuit is connected with the A/D converter by using a 40PIN socket; the integrated D/A filter circuit is connected with one or more of sensors through the data lines for processing various forms of signals; the embedded microcontroller is connected with the keyboard through the IIC interface; and the embedded microcontroller is connected with the LCD display by using the IIC interface, and is connected with the GPS receiver; the square wave signal sent from the integrated D/A filtering circuit are connected to the external interrupt in the CPU, thereby providing realization of the counting of digital signals.

The software implementation in the distributed networked data acquisition device is as follows (software flowchart shown in FIG. 3):

step 1: start;
step 2: read the configuration files INI of the device;
step 3: define exit address of the procedure;
step 4: establish exception vectors, interrupt vectors address, and enable interrupt;
step 5: storage system initialization by allocating memory to sampling data;
step 6: network protocol initialization and configuration;
step 7: I/O device and watchdog circuit initialization;
step 8: launch watchdog, and reading the GPS system clock correction;
step 9: establishing sampling interval and enable sampling channel;
step 10: await interruption;
step 11: if the interruption of continuous signal acquisition is acquired, signal acquisition procedure is performed for continuous signal;
  if the interruption of discrete signal acquisition is acquired, signal acquisition procedure is performed for discrete signal;
  if the interruption of watchdog is acquired, restart sampling, and return to step 2;
  if the interruption of GPS is acquired, proofread the re-installed clock, and return to step 2; and if uninterrupted, return to step 10;
step 12: perform software filtering on the data signals collected;
step 13: prepare data packet, and transmitting data packets and data to the LCD;
step 14: return to step 10, and continue waiting.

The software filtering implementation procedure is as follows (the principle diagram of the adaptive filtering is shown in FIG. 4):

step1: start;
step2: produce valuation signal, which is the filtered signal Y(n);
step3: calculate the differential signal before and after filtering, $X(n)-Y(n)=e(n)$;
step4: apply the differential signal to modify the valuation signal; and
step5: output the sampling signal Y(n) after filtering.

The advantages of this distributed networked data acquisition device according to the embodiments of the present invention are as follow:

1) Networked data acquisition can enable the presence of multi-point, real-time, and high-speed data acquisition, especially to be adapted to industrial control applications which require long-distance multi-point data acquisition and of data acquisition for complex engineering projects.

2) Due to the embedded (Linux) microcontroller in the distributed networked data acquisition device according to the present invention is adopting an ARMOR microprocessor having an RISC structure, an embedded and optimized computer control system having the following features is proposed: (1) reduced volume, lower power consumption, lower cost, and higher performance; (2) support of the Thumb (16 bits)/ARM (32 bits) instruction sets; (3) extensively using registers and faster command executing speed; (4) most data operations are completed in the registers; (5) addressing method is simple and flexible, and providing operational high-efficiency; (6) the length of the instructions are fixed.

3) Due to the adoption of multi-channel optical isolation OC circuit and RC filtering circuit, all types of discrete signals and continuous signals can be received directly from the field without being restricted by the type of sensors models. The discrete signals can be processed by the OC channel for fully isolating the signal from the embedded microcontroller. The RC filtering circuit and the second adaptive filtering of the software can remove high-frequency interference signal components to allowing for more accurate and precise data collection.

4) The distributed networked data acquisition device uses the GPS system, which can guarantee multi-point acquisition synchronization and thus providing assurance for high-precision processing of data.

5) The distributed networked data acquisition device can be connected using Ethernet for completing multi-point data acquisition, and at the same time for completing the uploading of data by using internet; in addition, the distributed networked data acquisition device has updating capabilities for multi-protocols and downloading functions suitable under various occasions and network communications protocols.

6) The distributed networked data acquisition device has superior expandability. The expansion of the corresponding template not only can increase the number of channels but can also increase the number of collection points. Single collection point can realize an optimal 32-channel D/A signal conversion, which can thereby meet complex processing requirements.

BRIEF DESCRIPTION OF THE DRAWINGS

The present invention will be apparent to those skilled in the art by reading the following detailed description of a plurality of embodiments thereof, with reference to the attached drawings, in which:

FIG. 5(*b*) is a schematic view showing the conceptual layout of an integrated A/D filtering circuit, according to the second embodiment of the present invention.

DETAILED DESCRIPTION OF THE PREFERRED EMBODIMENTS

First Embodiment

Figure 1:
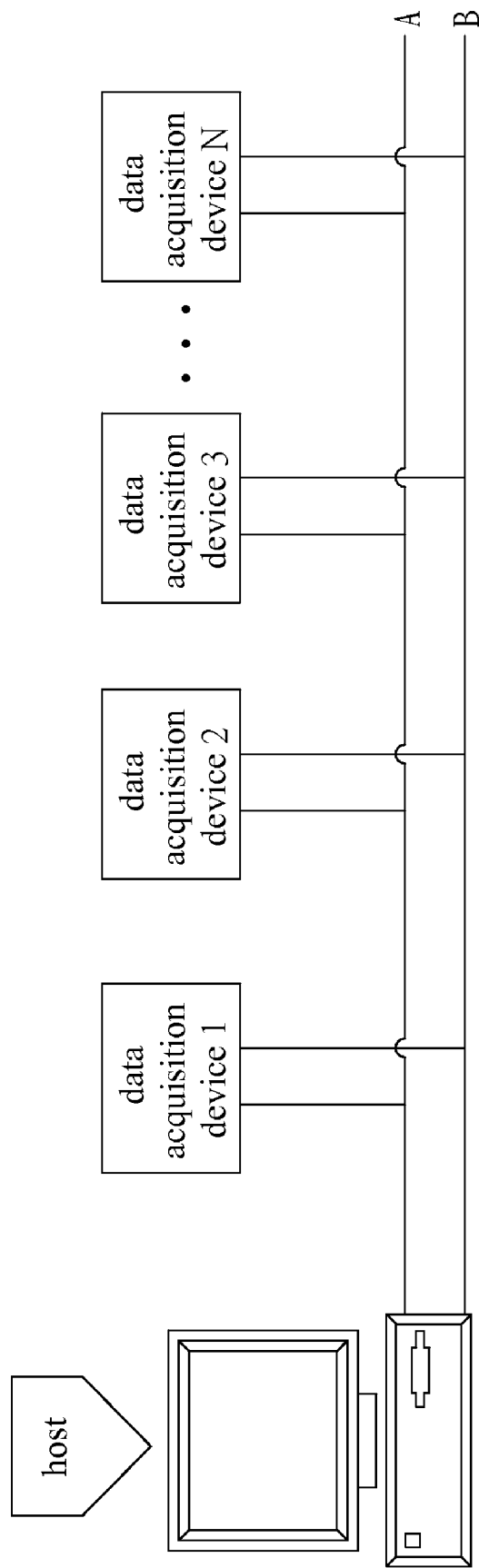
FIG. 1 is a schematic view showing a distributed networked data acquisition system having a plurality of connections of the distributed networked data acquisition devices, according to a first embodiment of the present invention.

A technical proposal, according a first embodiment of the present invention, is to use a plurality of distributed networked data acquisition devices with a host to form a distributed networked data acquisition system (schematic view as shown in FIG. 1). The host is able to implement the acquisition of the dynamic display of the data and the coordination and control of many distributed networked data acquisition devices by means of the data collection software. The distributed networked data acquisition devices are connected with the host by means of transmission media (such as, for example, twisted pair wires, and fiber, etc.) and the adoption of distributed data acquisition network, which also include multi-card network operation or HUB network (expanding channels 16× number of cards), to be able to implement the multi-point data acquisition of a plurality of distributed networked data acquisition devices working together simultaneously and adopting several twisted pair wires (or fiber) to connect to the distributed networked data acquisition device at every distribution point. Each distributed networked data acquisition device can further connect with a plurality of different types of sensors (each sensor can collect a plurality of different types of continuous signals). The number of the distributed networked data acquisition devices (that is also the number of collection points) is determined by the requirements of the actual specific situation. The host controls the distributed networked data acquisition devices by performing the following: after the system is launched, the host, by means of an election signal, determines physically to elect a particular distributed networked data acquisition device for collecting data, and waits for the successful launch signal that is returned back from the distributed networked data acquisition device. When the distributed networked data acquisition device has received the election signal, the system is launched, whereby the initialization of the distributed networked data acquisition device is completed by the program in the embedded Linux system, and then a successful launch signal of the distributed networked data acquisition device is returned to the host. If the host does not receive a signal to be returned from the distributed networked data acquisition device, it should then send out a warning showing the identification number of the failed distributed networked data acquisition device. And the worker can then arrive at the scene for further investigation, and thereby eliminate and resolve the problems. The host then completes the real-time display of the data acquisition at the same time.

Second Embodiment

Figure 2:
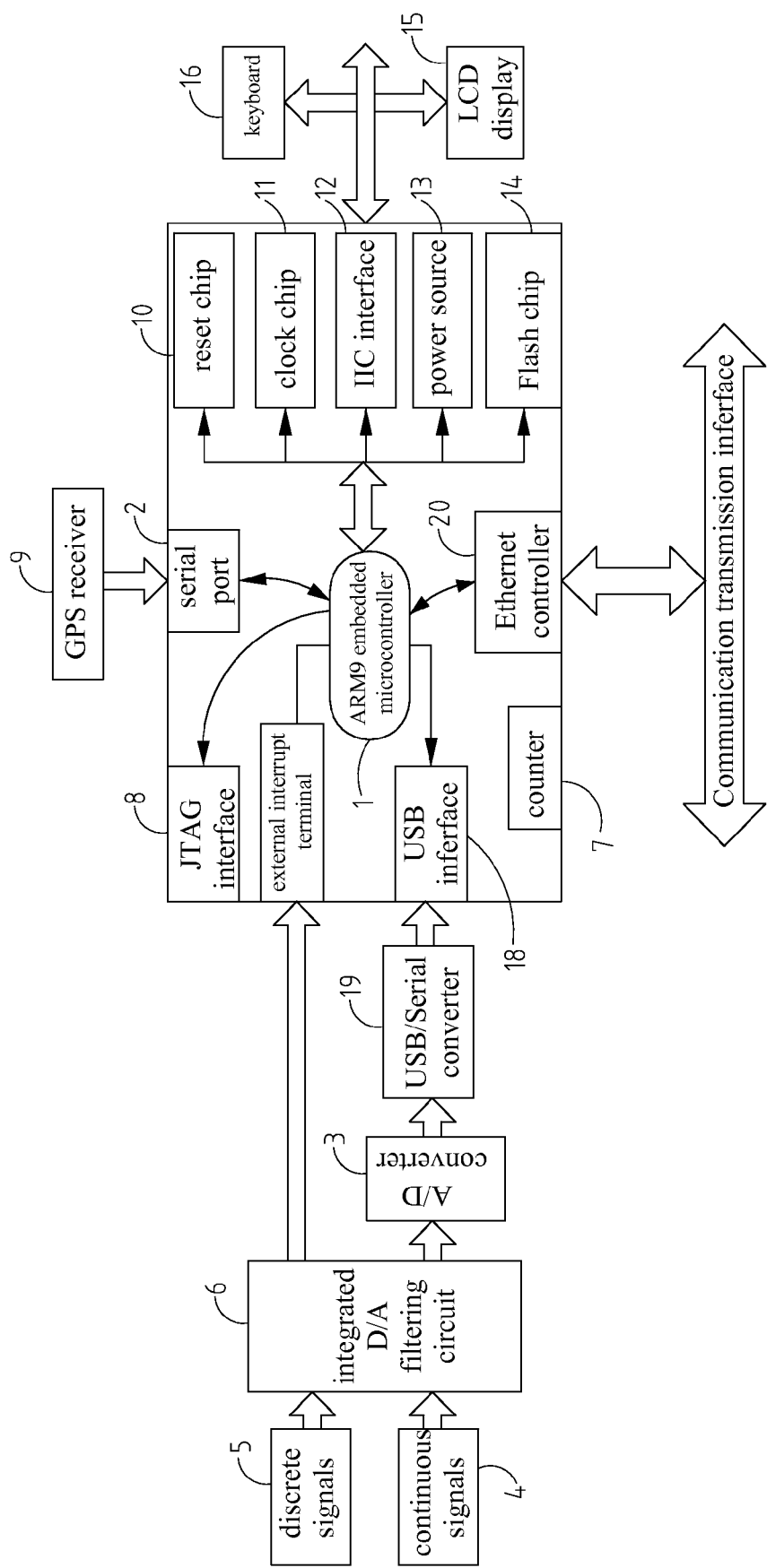
FIG. 2 is a block diagram showing the assembly structure of the distributed networked data acquisition device, according to a second embodiment of the present invention.
Figure 3:
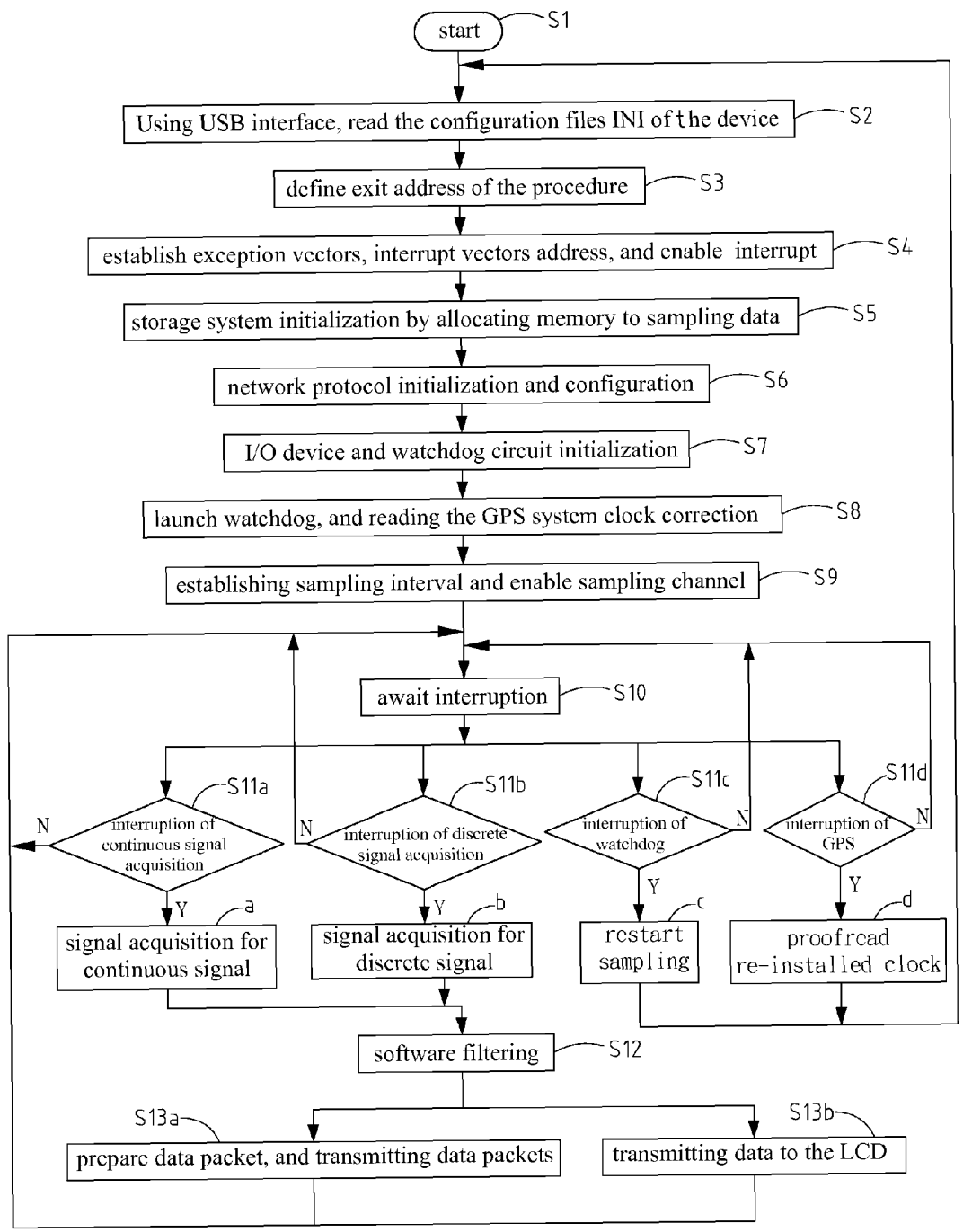
FIG. 3 is a flowchart showing the operation of the software of the distributed networked data acquisition device, according to the present invention.
Figure 4:
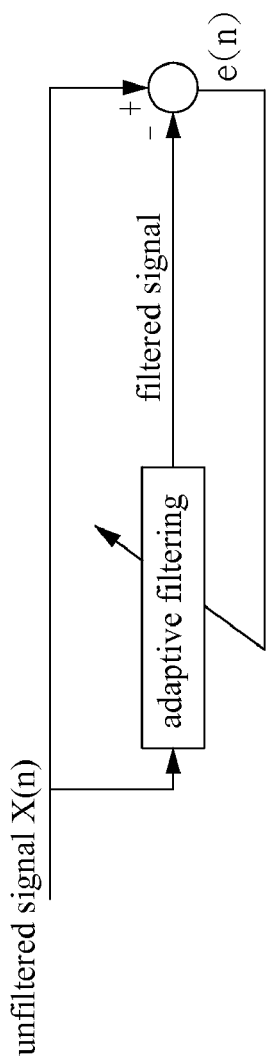
FIG. 4 is a block diagram showing the operating principle of adaptive filtering, according to the present invention.

The distributed networked data acquisition device, according to a second embodiment of the present invention, is shown in FIG. 2. The distributed networked data acquisition device includes an embedded microcontroller 1 based on the ARM9 core, a serial port 2 based on the ARM9 core in the ARM processor chip, a GPS receiver 9, a reset chip 10, a clock chip 11, an IIC interface 12 inside the ARM processor chip, a power supply chip 13, a Flash memory chip 14, a SDRAM chip 21, a LCD display 15, a small keyboard 16, an Ethernet controller 20, a USB interface 18, a USB/Serial converter 19, an A/D converter 3, an integrated D/A filtering circuit 6, a counter 7 in the ARM processor chip, and a JTAG interface 8 in the embedded operating system debug interface circuit.

Figure 5A:
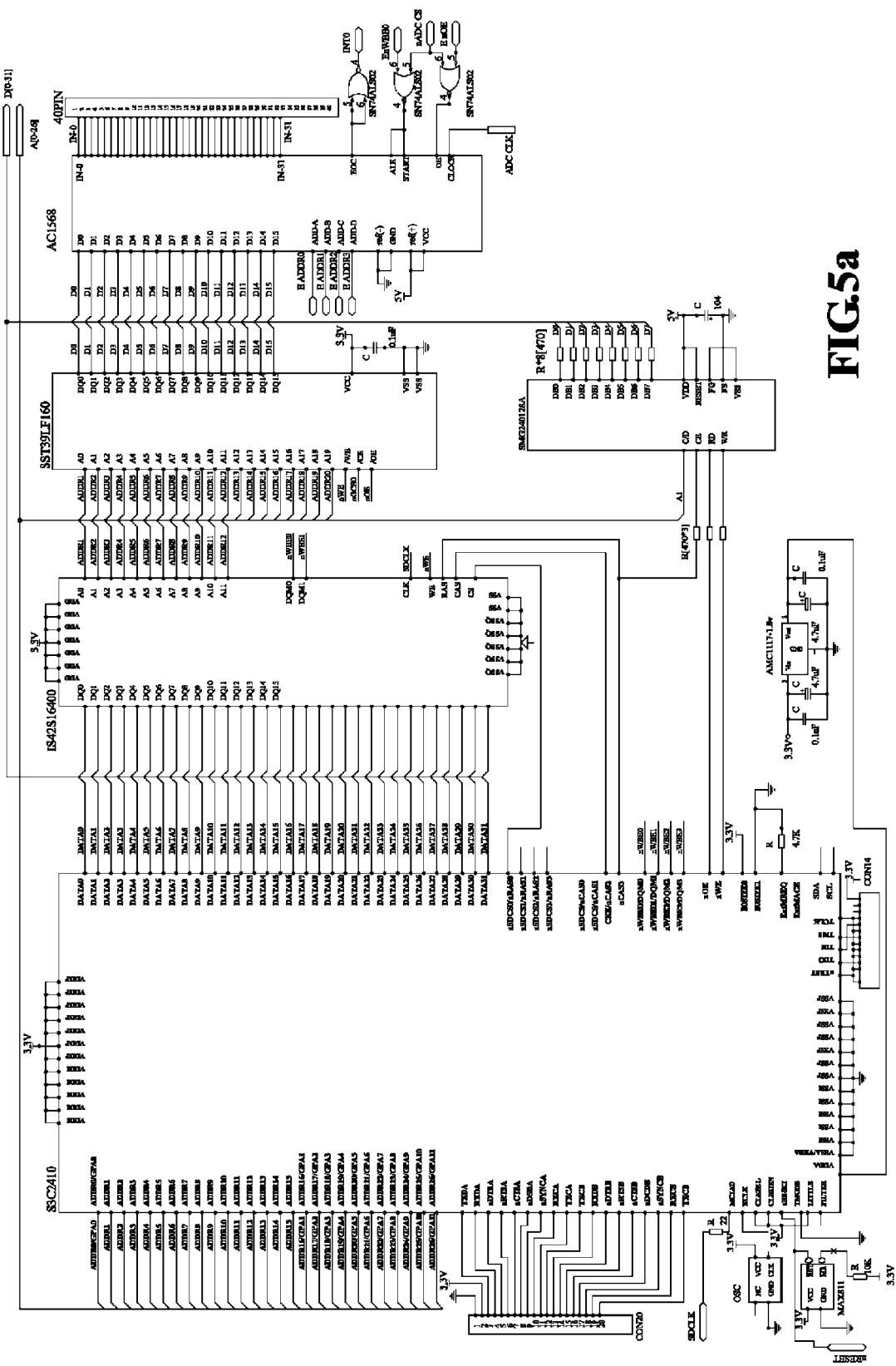
FIG. 5(*a*) is a schematic view showing the conceptual layout of the distributed networked data acquisition device circuit, according to the second embodiment of the present invention.
Figure 5B:
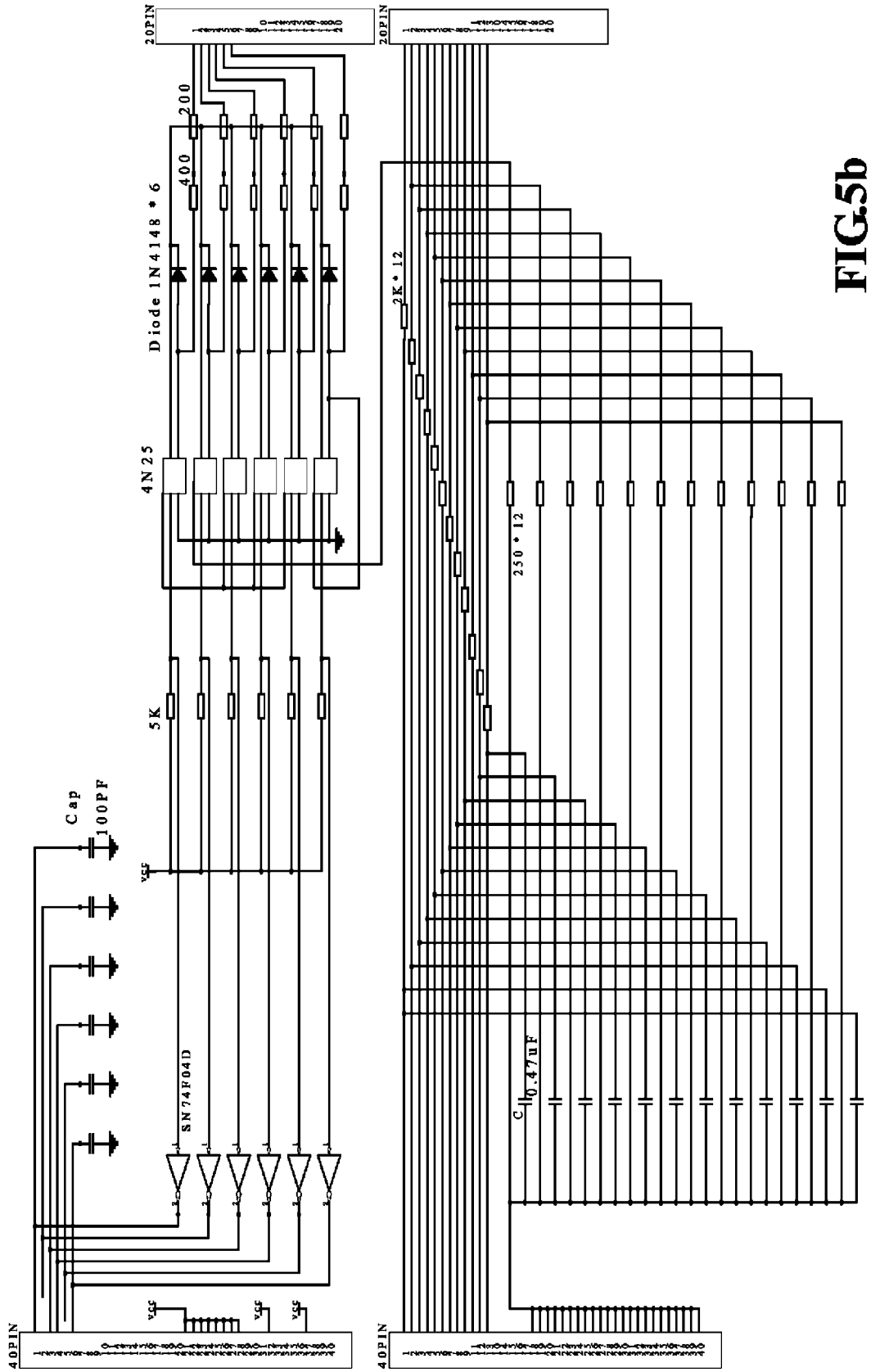

The embedded microcontroller 1, for example, a Samsung® S3C2410 microcontroller, is connected with a clock oscillator chip OSC via a pin XCLK. The pin VCC of the clock oscillator chip OSC is to be plugged-in to the power supply chip 13, for example, a 3.3V power supply chip LD111725; the reset chip 10, for example, a Maxim® MAX811, is connected with the embedded microcontroller 1 by using the pin nRSET; and the pin VCC of the reset chip 10 is to be plugged-in to the power supply chip 13; the flash memory chip 14, for example, a SST® SST39LF160 flash memory chip is mapped inside a first region, as defined as the region Bank0, of the embedded microcontroller 1, S3C2410, and makes the address line of the embedded microcontroller 1 to be "shifted-left" by one bit so that the ADDR1 of the embedded microcontroller 1 is connected with A0 of the flash memory chip 14, which is SST39LF160; the address of the SDRAM chip 21, for example, Integrated Silicon Solution's IS42S16400, is mapped inside the second region, which is defined as the Bank6 region, inside of the embedded microcontroller 1, which is S3C2410; the A/D converter 3, for example, AC1568, is connected with the USB interface 18 of the embedded microcontroller 1 through the USB/Serial converter 19; the integrated D/A filtering circuit 6 (as shown in FIG. 5(b)) is connected with the A/D converter 3, AC1568, by using the 40PIN socket; the integrated D/A filtering circuit 6 is connected with different types of sensors through the data lines for the processing of various forms of continuous or discrete signals; the embedded microcontroller 1 is connected with the small keyboard 16, for example a small matrix keyboard, through the IIC interface 12 opening; and the embedded microcontroller 1 is connected with the LCD display 15, for example, Changsha Sunman Electronics SMG240128A, through the IIC interface 12, and is connected with the pins, for example, XDATA28 and XDATA29, of the GPS receiver 9, for example, GSU-4, through the UART interface (serial interface 2). The square wave signals sent from the integrated D/A filter circuit 6 are connected to the external interrupt in the embedded microcontroller 1, for example, the ARM processor chip through the pin EINT of the ARM processor chip, thereby providing the realization of counting the digital signals, as shown in FIG. 5(a).

The embedded microcontroller 1 can be, for example, a CPU which utilizes a SOC high-performance low-power consumption 32-bit system on chip processor based on the ARM 920T, having a cache with a 16K instruction and a 16K data, a memory management unit (MMU), a bus interface AHB, and a Thumb16 instruction system. The processing speed of the embedded microcontroller 1 chip is 1.1 MIPS/MHZ, and the clock frequency is 200 MHZ.

The distributed networked data acquisition device, according to the second embodiment of the present invention, adopts the embedded Linux operating system, and utilizes a mixed-language program written in assembly language and C language. The mixed-language completes the system initialization, stack setup, interrupt vector setup, enable interrupt, and other kernel operations; the C language provides for the drafting of specific procedural codes. So the processing speed in the execution of procedures can be improved, and it would be beneficial for code modification of the procedures due to expanded functionalities in the future.

The embedded microcontroller 1 is connected with the USB/serial port converter 19 through the USB interface 18. The USB interface 18 can be expanded into two RS232 serial ports and two RS485 interfaces. Then, the RS232 interface is connected with the A/D converter 3 for completing the collection of signals and D/A conversion. This connection method not only expands the quantity of interfaces but also takes full advantages of the speed and stability of the hardware in the form of the USB interface. Under a user's perspective, the most familiar serial-port communication will remain to be used. The embedded microcontroller 1 can be connected with the GPS receiver 9 through the serial interfaces 2 for completing the system clock initialization in the distributed networked data acquisition device and clock synchronization function in each of the distributed networked data acquisition devices. The A/D converter 3's interface circuit is an important link for performing the conversion of one or more analog signals into digital signals before accessing the data acquisition system for enabling further system processing. This system adopts a 16-bit A/D board AC1568 that provides 32-channel single-ended inputs and 16-channel two-way differential inputs, in the range of 10V (−5V~+5V). The input channel velocity is 10 ms (and is 20 ms when the magnification is 4 or 8) and the accuracy is 16 bits. The 16-bit A/D board AC 1568 can be widely used in all types of analog measurements, computer interfaces of instruments, and multi-channel analog signal measurements. The embedded microcontroller 1 is connected with the LCD display 15 and the small keyboard 16 through the IIC interface 12 circuit, which can be done by installing the LCD 15 in the distributed networked data acquisition device to show the value of the data collected instantly, and can complete the necessary data entries by using the small keyboard 16. The embedded microcontroller 1 can be connected with the GPS receiver 9 through the serial ports 2 for completing the distributed networked data acquisition device initialization, acquisition system clock correction, setting up of vector interrupt, and cycling until the GPS interruption. The embedded microcontroller 1 can be connected with the reset chip (watchdog) 10, and to be set up with the appropriate attribute values for ensuring the proper operation on the embedded microcontroller. The embedded microcontroller 1 brings along an Ethernet controller 20 itself, which can provide 10M/100M Ethernet interface to support the media-independence interface and the DMA interface with a buffer, so that the Ethernet can be linked under half-duplex and full-duplex modes. The embedded microcontroller 1 can be connected with the 16M flash memory chip 14, SST39LF160, and the SDRAM chip 21, the 64M SDRAMIS42S16400, externally for meeting relatively complex processing conditions. The embedded microcontroller 1 can be electrically-connected with the integrated D/A signal filtering circuit 6 via the internal bus. The integrated D/A signal filtering circuit 6 adopts a 12-channel RC filtering circuit and a 6-channel optical isolation (OC) circuit integrated together on a piece of circuit board for improving the stability, reliability, and extensibility of the system. The discrete data uses photoelectric isolation techniques for completely isolating the embedded microcontroller and the discrete signals, which has higher input impedance and common mode rejection ratio. The continuous signals use a first-order low-pass RC filtering circuit and adaptive filtering software for filtering the high frequency components for improving the SNR. Multi-channel discrete input signals and multi-channel continuous input signals receive measurement signals coming from the sensors in the industrial field or from other input signals that are consistent with industry standards. The input signals are not limited by the types of sensors and the categories of the measurement signals, so long as the standard electrical signals will do.

Third Embodiment

The third embodiment of the present invention is the application of the distributed networked data acquisition device in an oilfield pipeline leakage fault detection and positioning system.

According to the third embodiment, the distributed networked data acquisition device collects pressure, temperature, and flow rate signals from the sensors at the two ends of the pipeline and are to perform diagnosis and positioning of the pipeline leakage using the software inside the host. The high-speed, responsiveness, and acquisition synchronicity of the distributed networked data acquisition device according to the present invention provides a reliable guarantee on the high-speed of the leak diagnosis and the accuracy of the positioning in this system.

According to the third embodiment, the embedded microcontroller 1, S3C2410, is connected with the clock oscillator chip OSC through the XCLK pin. The VCC pin of the OSC is to be plugged-in to the 3.3V power supply chip 13, LD1117525; the reset chip 10, MAX811, is connected with the embedded microcontroller 1, S3C2410, through the pin nRSET; and the VCC pin is to be plugged-in to the 3.3V power supply chip 13, LD1117525; the address of flash memory chip 14, SST39LF160, is mapped in the first region, the Bank0 region, of the embedded microcontroller 1, S3C2410. The address of the SDRAM chip 21, memory chip IS42S16400, is mapped in the second region, the Bank6 region, of the embedded microcontroller 1, S3C2410; the A/D converter 3, AC1568, is connected with the USB interface 18 of the embedded microcontroller 1, S3C2410, by using the USB/serial ports converter 19; the integrated D/A filter circuit 6 is connected with the A/D converter 3, AC1568, by using the 40PIN sockets, and also is connected with the pressure, temperature sensors by using the data lines for processing the pressure and temperature signals; the flow rate sensor, which is collecting the flow rate signals, launches a plurality of square wave signals into a port, for example, the EINT port, of the embedded microcontroller 1, S3C2410; the embedded microcontroller 1, S3C2410 is connected with the small keyboard 16, such as the matrix keyboard, by using the IIC interface 12, and is connected with the XDATA28 and the XDATA29 pins of the GPS receiver 9, GSU-4, by using the UART port (serial port 2). The embedded microcontroller 1 controls the operating process of the entire overall acquisition device, and is connected with the GPS receiving system by using the serial interface 2, and connects with the other devices by using NIC for enabling communication.

The Operation of the System is as Follows:

In this embodiment, the embedded microcontroller 1 CPU adopts a high-performance and low-power consumption SOC 32-bit processor based on the ARM 920T, having a cache with 16K instruction and 16K data, a memory management unit MMU, an AHB bus interface, and a Thumb16 instruction system. The processing speed of the embedded microcontroller 1 chip is 1.1 MIPS/MHZ, and the clock frequency is 200 MHZ. The pressure and the temperature sensors used in the field are to collect 6-channel pressure, and 6-channel temperature analog signals (the most can be 32-channel because of the D/A conversion). Standard signal is transmitted into the integrated D/A signal filtering circuit 6 in this distributed networked data acquisition device, according to the second embodiment of the present invention, to do low-pass filtering for removing high-frequency constituent, and then is converted into digital signals by using the A/D converter 3 board, AC1568. The 6-channel flow pulse-signal is transmitted into the OC circuit to perform noise filtering, and then digital signals can be produced by using the inner counting board of the embedded microcontroller 1. Three types of digital signals are compressed and are transmitted to the database of the host in the Ethernet for analysis by using the NIC. Meanwhile, the embedded microcontroller 1 receives messages from the GPS by using the serial ports 2, thereby ensuring that the host is able to receive data transmitted from the two ends of the channel at the exact same sampling time, and thus guaranteeing high-precision positioning and accurate leak detection.

The embedded microcontroller 1 can be connected with a small keyboard 16 and a LCD display 15 for performing programming adjustments or modifications. The operating system, the development kit systems and environment, network communication protocol, and other contents are stored in the storage media. The detection and positioning system can detect a 100 km fluid pipeline at the most, and can sample about 30 L/min leakage warning within 100 seconds, and whose positioning accuracy is 2% of the entire tube length.

Fourth Embodiment

According to the fourth embodiment of the present invention, the distributed networked data acquisition device is applied in a sewage treatment dosage control and turbidity monitoring system.

Figure 6:
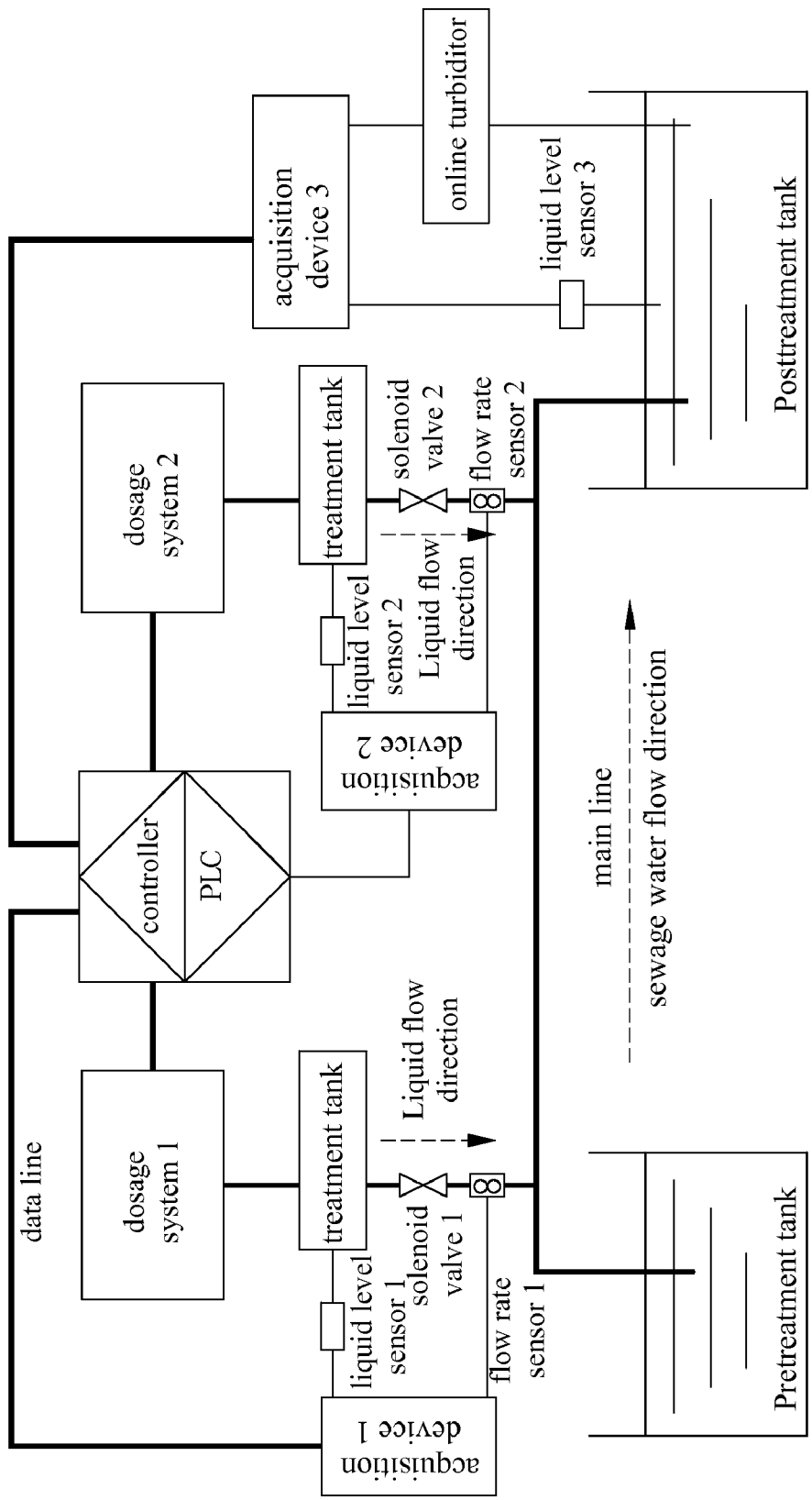
FIG. 6 is a graphic showing the sewage treatment dosage control and turbidity monitoring system, according to a fourth embodiment of the present invention.

As shown in FIG. 6, the turbidity signal can be sampled from the system by using the device according to the present invention; and through the changes of the flow rates from the programmable logic controller (PLC) controlled dosage system, and at the same time, the ingredient concentration signals collected from the acquisition device, which provides for assurance of the constant stability of the liquid dosage ingredients. The high-speed, fast responsiveness, and synchronicity according to the present invention provides assurances on the high-speed and stability in the overall process.

The embedded microcontroller 1, S3C2410, is connected with the clock oscillator chip OSC through the XCLK pin. The VCC pin of the OSC is to be plugged-in to the 3.3V power supply chip 13, LD1117525; the reset chip 10, MAX811, is connected with the embedded microcontroller 1, S3C2410, through the pin nRSET; and the VCC pin is to be plugged-in to the 3.3V power supply chip 13, LD1117525; the address of the flash memory chip 14, memory chip SST39LF160, is mapped in the first region, Bank0 region, of the embedded microcontroller 1, S3C2410. The address of the SDRAM chip 21, IS42S16400, is mapped in the second region, Bank6 region, of the embedded microcontroller 1, S3C2410; the A/D converter 3, AC1568, is connected with the USB interface 18 of the embedded microcontroller 1 by using the USB/serial ports converter 19; the integrated D/A filter circuit 6 is connected with the A/D converter 3, AC1568, by using the 40PIN sockets, and are connected with the flow rate sensors, and the liquid level sensors by using the data lines. The embedded microcontroller 1, S3C2410, is connected with the PLC through the twisted pair wires (UTP). The PLC controls the normal operation of the entire system, and performing the data processing on the sampled data collected from all the sampling points to accomplish the entire dosage control of sewage treatment, which thereby ensures overall process normality. The inner part of the distributed networked data acquisition device is controlled by the embedded microcontroller 1 for completing the collecting of the turbidity and the liquid level signals, and also the filtering processing. The high-speed, high-effectiveness, highly-intelligent, and faster responsiveness of the overall device fully guarantees the stability of the sewage treatment process.

The Operation of the System is:

In this embodiment, the 6-channel flow rate and the 6-channel liquid level analog signals collected from the flowmeter and the liquid level meter out in the field are transmitted into the integrated D/A signal filtering circuit 6 through the standard interface of the distributed networked data acquisition device to perform RC filtering for removing the interference signals, and then to go through the A/D converter 3 board, AC1568, for converting the analog signals into digital signals. An online turbiditor, for example, WT-0T2 from Wuhanwater, sends back the tank turbidity after which was processed. A plurality of multi-channel signals are transmitted into the embedded microcontroller 1 for performing data packaging by using the data bus and to be uploaded on the host PLC by using the NIC. The host PLC analyses turbidity signals by using the software, and changes the flow rate of the dosage solutions according to the requirements for achieving dosage control. Meanwhile, the host guarantees the adequacy of the dosage solution and the liquid level of the treatment tank according to the liquid level signals sampled from the field. The GPS of the distributed networked data acquisition device is to complete a system timing verification, for guaranteeing the synchronous sampling for thus ensuring the high accuracy and reliability of the overall process.

The acquisition device can also be connected with keyboards, displays, and other input devices for modifying and debugging the program for storing in the memory media. The memory media can also store operating system, development kit system, and network protocols, etc. The distributed networked data acquisition device can change network protocol according to the practical requirements based on communication.

Fifth Embodiment

According to the fifth embodiment of the present invention, the distributed networked data acquisition device is used in a temperature and humidity control system in grain silo.

The system in the fifth embodiment adopts a master and slaves configuration. The host is in charge of the data processing and the control of the system; this device is used at all of the sampling points in the form of the distributed networked data acquisition device for collecting and uploading data. Because of the uniqueness of temperature measurements in grain silo, it requires multi-point measurement samplings. The network connectivity of this device is rightly adapted for this application. The high-speed, network connectivity, and responsiveness can fully guarantee for the stability of the temperature and humidity monitoring system operation.

The embedded microcontroller 1, S3C2410, is connected with the clock oscillator chip OSC through the XCLK pin. The VCC pin of the OSC is to be plugged-in to the 3.3V power supply chip 13, LD1117525; the reset chip 10, MAX811, is connected with the embedded microcontroller 1, S3C2410, through the pin nRSET; and the VCC pin is to be plugged-in to the 3.3V power supply chip 13, LD1117525; the address of the flash memory chip 14, SST39LF160, is mapped in the first region, Bank0 region, of the embedded microcontroller 1, S3C2410. The address of the SDRAM chip 21, IS42S16400, is mapped in the second region, Bank6 region, of the embedded microcontroller 1, S3C2410; the A/D converter 3, AC1568, is connected with the USB interface 18 of the embedded microcontroller 1, S3C2410, by using the USB/serial ports converter 19; the integrated D/A filter circuit 6 is connected with the A/D converter 3, AC1568, by using the 40PIN sockets, and also is connected with the temperature, and humidity sensors by using data lines; the embedded microcontroller 1, S3C2410, is connected with the small keyboard 16, for example, the matrix keyboard, by using the IIC interface 12; the embedded microcontroller 1, S3C2410, is connected with the LCD display 15, SMG240128A, and is connected with the XDATA28 and the XDATA29 pins of the GPS receiver 9, GSU-4, by using the UART port (serial ports).

The Operation of the System is:

In this embodiment, each distributed networked data acquisition device first transmits the temperature and humidity signals collected from the temperature and humidity sensors into the integrated D/A signal filtering circuit 6 at inside for filtering. And then the A/D converting is performed through the A/D converter 3 board, AC1568, of the distributed networked data acquisition device. All digital signals converted are packaged and transmitted into the host via the internet, and are analyzed and processed by the software of the host for completing the monitoring on the whole system. The GPS in the distributed networked data acquisition device can guarantee the synchronous sampling at all sampling points, which ensures the data acquisition accuracy and the correctness of subsequent monitoring.

The system can be connected with keyboard, display, and other input devices for modifying and debugging the system program. The memory media can store operating system, development kit tools, and network protocol, etc. This invention demonstrates superiority based on its compatibility with the internet. The modification and uploading of the network protocol are sufficient to meet the requirements of the network in practice, and fully demonstrates the advantages of this device in this embodiment.

Although the present invention has been described with reference to the embodiments thereof, it is apparent to those skilled in the art that a variety of modifications and changes may be made without departing from the scope of the present invention which is intended to be defined by the appended claims.

What is claimed is:

1. A distributed networked data acquisition system, comprising:
    a host;
    a plurality of distributed networked data acquisition devices for performing a plurality of data acquisitions, each of said plurality of distributed networked data acquisition devices further comprising:
        an embedded microcontroller connected to a reset chip, a clock oscillator chip, an external interrupt terminal, a serial port, an IIC interface, a USB interface, a JTAG interface, an Ethernet controller, and a power supply chip;
        a flash memory chip connected to said embedded microcontroller and mapped in a first memory address region of said embedded microcontroller;
        a SDRAM chip connected to said embedded microcontroller and mapped in a second memory address region of said embedded microcontroller;
        a GPS receiver connected to said serial port;
        an integrated D/A filtering circuit connected to said external interrupt terminal;
        an A/D converter coupled to said integrated D/A filtering circuit and connected to said USB interface through a USB/serial converter;
        a keyboard connected to said microcontroller through said IIC interface; and
        a LCD display connected to said microcontroller through said IIC interface;
        one or more sensors connected to the integrated D/A filtering circuits of said plurality of data acquisition devices; and
    one or more transmission media connecting said plurality of distributed networked data acquisition devices to said host, said one or more transmission media including a plurality of unshielded twisted pairs (UTP) for connecting said plurality of distributed networked data acquisition devices in various distribution points;
    wherein said one or more sensors may include different types of sensors for detecting different types of continuous signals; and said host controls and coordinates said plurality of distributed networked data acquisition devices to form a distributed data acquisition network, and implements dynamic display for said plurality of data acquisitions.

2. The distributed networked data acquisition system as claimed in claim 1, further comprising an adaptive filter implemented in software of said embedded microcontroller for removing high frequency interference signal components.

3. The distributed networked data acquisition system as claimed in claim 1, wherein said embedded microcontroller comprises multiple registers, has fixed instruction length, fully supports Thumb (16 bits)/ARM (32 bits) instruction sets, and is based on RISC architecture.

4. The distributed networked data acquisition system as claimed in claim 1, wherein said integrated D/A filtering circuit further comprises:
    a multi-channel optical isolation circuit for isolating discrete signals from said embedded microcontroller; and
    a RC filtering circuit for removing high frequency interference signal components.

5. The distributed networked data acquisition system as claimed in claim 1, wherein the Ethernet controller is used for connecting the distributed networked data acquisition devices to a network for completing multi-point data acquisition, and for uploading of a plurality of data using internet, and for updating system settings for multi-protocols and for network communications.

6. A method of using the distributed networked data acquisition device as claimed in claim 1, comprising:
    collecting a plurality of pressure, temperature and flow rate signals from a plurality of pressure, temperature, and flow rate sensors, respectively, at two ends of an oilfield pipeline for detection of any leakage fault and performing diagnosis and positioning of any pipeline leakage;
    connecting the integrated D/A filtering circuit of the distributed networked data acquisition device with a plurality of pressure sensors by using data lines for processing the pressure signals;
    connecting the integrated D/A filtering circuit of the distributed networked data acquisition device with a plurality of temperature sensors by using data lines for processing the temperature signals; and
    launching a plurality of square wave signals into a port of the embedded microcontroller by one or more flow rate sensors;
    wherein the embedded microcontroller is connected with the GPS receiver by using a serial interface, and is connected with other devices by using a network interface card for enabling communication.

7. A method of using the distributed networked data acquisition device as claimed in claim 1, comprising:
    sampling a plurality of turbidity, flow rate, ingredient concentration, and liquid level signals from the distributed networked data acquisition system by using the distributed networked data acquisition device in a sewage treatment dosage control and turbidity monitoring system;

controlling system operations, and performing data processing on the sampled signals collected from all sampling points using a programmable logic controller (PLC);

connecting the integrated D/A filtering circuit of the distributed networked data acquisition device with a plurality of flow rate sensors by using data lines for processing a plurality of flow rate signals;

connecting the integrated D/A filtering circuit of the distributed networked data acquisition device with a plurality of liquid level sensors by using data lines for processing a plurality of liquid level signals; and connecting the embedded microcontroller with the PLC through UTP, wherein inner operations of the distributed networked data acquisition device are controlled by the embedded microcontroller for the completion of the collection of the turbidity signals and the liquid level signals, and also for the filtering processing.

8. A method for implementing data acquisition using the distributed networked data acquisition device as claimed in claim 1, comprising:
   step 1: starting;
   step 2: reading configuration files of the distributed networked data acquisition device;
   step 3: defining an exit address of the method;
   step 4: establishing exception vectors, interrupt vectors address, and enable interrupt;
   step 5: initializing a storage system, and allocating memory to sampling data;
   step 6: initializing and configuring network protocol;
   step 7: initializing an I/O device and a watchdog circuit;
   step 8: launching watchdog, and reading clock correction of the GPS device to re-install clock;
   step 9: establishing sampling interval and enabling sampling channel;
   step 10: awaiting interruption;
   step 11: if interruption of continuous signal acquisition is acquired, a signal acquisition procedure is performed for continuous signal;
      if interruption of discrete signal acquisition is acquired, a signal acquisition is performed for discrete signal;
      if interruption of watchdog is acquired, restarting sampling, and returning to step 2;
   if interruption of GPS receiver is acquired, proofreading the re-installed clock, and returning to step 2; and if uninterrupted, returning to step 10;
   step 12: performing software filtering on the data signals collected;
   step 13: preparing data packet, and transmitting data packets and data to the LCD display; and
   step 14: returning to step 10, and continuing waiting.

9. The method as claimed in claim 8, wherein the software filtering in step 12, comprising:
   step 1: starting;
   step 2: producing a valuation signal which is a filtered signal $Y(n)$;
   step 3: calculating a differential signal $e(n)$ before and after filtering, wherein $X(n)-Y(n)=e(n)$, and $X(n)$ is an unfiltered signal;
   step 4: applying the differential signal to modify the valuation signal; and
   step 5: outputting a sampling signal $Y(n)$ after filtering.

* * * * *